US012293191B2

United States Patent
Li et al.

(10) Patent No.: US 12,293,191 B2
(45) Date of Patent: May 6, 2025

(54) FINE-GRAINED IMAGE RECOGNITION METHOD AND APPARATUS USING GRAPH STRUCTURE REPRESENTED HIGH-ORDER RELATION DISCOVERY

(71) Applicant: BEIHANG UNIVERSITY, Beijing (CN)

(72) Inventors: Jia Li, Beijing (CN); Yifan Zhao, Beijing (CN); Dingfeng Shi, Beijing (CN); Qinping Zhao, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 818 days.

(21) Appl. No.: 17/546,993

(22) Filed: Dec. 9, 2021

(65) Prior Publication Data

US 2022/0382553 A1    Dec. 1, 2022

(30) Foreign Application Priority Data

May 24, 2021   (CN) .......................... 202110567940.9

(51) Int. Cl.
G06F 9/38       (2018.01)
G06F 9/30       (2018.01)
G06N 3/02       (2006.01)

(52) U.S. Cl.
CPC ........ *G06F 9/3836* (2013.01); *G06F 9/30036* (2013.01); *G06N 3/02* (2013.01)

(58) Field of Classification Search
CPC ..... G06F 9/30036; G06F 9/3836; G06N 3/02; G06N 3/045; G06N 3/0464; G06N 3/048; G06N 3/09
See application file for complete search history.

(56) References Cited

U.S. PATENT DOCUMENTS

2006/0018566 A1*  1/2006  Coleman ............... G06T 3/4061
                                                  382/312
2016/0140424 A1*  5/2016  Wang .................. G06F 18/2414
                                                  382/156
(Continued)

FOREIGN PATENT DOCUMENTS

CN       110674866 A      1/2020
CN       110751212 A      2/2020

OTHER PUBLICATIONS

Hang Xu et al., "Spatial-aware Graph Relation Network for Large-scale Object Detection," Jun. 2019, Proceedings of the IEEE/CVF Conference on Computer Vision and Pattern Recognition (CVPR), 2019, pp. 9298-9303.*

(Continued)

*Primary Examiner* — Omar S Ismail
(74) *Attorney, Agent, or Firm* — J.C. PATENTS (57) ABSTRACT

Embodiments of the present disclosure provides a fine-grained image recognition method and apparatus using graph structure represented high-order relation discovery, wherein the method includes: inputting an image to be classified into a convolutional neural network feature extractor with multiple stages, extracting two layers of network feature graphs in the last stage, constructing a hybrid high-order attention module according to the network feature graphs, and forming a high-order feature vector pool according to the hybrid high-order attention module, using each vector in the vector pool as a node, and utilizing semantic similarity among high-order features to form representative vector nodes in groups, and performing global pooling on the representative vector nodes to obtain classification vectors, and obtaining a fine-grained classification result through a fully connected layer and a classifier based on the classification vectors.

20 Claims, 4 Drawing Sheets

(56) References Cited

U.S. PATENT DOCUMENTS

| | | | | |
|---|---|---|---|---|
| 2016/0140438 | A1* | 5/2016 | Yang | G06N 3/08 |
| | | | | 706/12 |
| 2016/0210533 | A1* | 7/2016 | Kiapour | G06V 10/245 |
| 2016/0307072 | A1* | 10/2016 | Zhou | G06V 10/426 |
| 2017/0124432 | A1* | 5/2017 | Chen | G06N 5/04 |
| 2017/0293824 | A1* | 10/2017 | Chen | G06F 16/5838 |
| 2019/0073560 | A1* | 3/2019 | Matei | G06N 3/08 |
| 2019/0171904 | A1* | 6/2019 | Sun | G06V 20/35 |
| 2019/0385106 | A1* | 12/2019 | Iventosch | G06V 10/454 |
| 2020/0074589 | A1* | 3/2020 | Stent | G06F 3/013 |
| 2020/0089966 | A1* | 3/2020 | Tsai | G06F 18/2155 |
| 2020/0097604 | A1* | 3/2020 | Lee | G06N 3/08 |
| 2020/0160124 | A1* | 5/2020 | Fu | G06V 10/764 |
| 2021/0350524 | A1* | 11/2021 | Bishop | G06T 11/60 |

OTHER PUBLICATIONS

Ting Sun, "Fine-grained categorization via CNN-based automatic extraction and integration of object-level and part-level features," Jun. 24, 2017, Image and Vision Computing 64 (2017), pp. 47-64.*

Ye Xiang et al., "Global Topology Constraint Network for Fine-Grained Vehicle Recognition,"Jun. 29, 2020, IEEE Transactions On Intelligent Transportation Systems, vol. 21, No. 7, Jul. 2020, pp. 2918-2925.*

Yang Liu et al., "Hybrid-order and Multi-stream Convolutional Neural Network for Fine-grained Visual Recognition,"Dec. 8, 2019,2019 11th International Conference on Wireless Communications and Signal Processing (WCSP), pp. 1-4.*

Ming Sun et al., "Multi-Attention Multi-Class Constraint for Fine-grained Image Recognition," Sep. 2018, Proceedings of the European Conference on Computer Vision (ECCV), 2018, pp. 1-14.*

Yuansheng Hua et al., "Recurrently exploring class-wise attention in a hybrid convolutional and bidirectional LSTM network for multi-label aerial image classification," Feb. 5, 2019, ISPRS Journal of Photogrammetry and Remote Sensing 149 (2019),pp. 188-197.*

Yu Kong et al., "Deeply Learned View-Invariant Features for Cross-View Action Recognition," May 3, 2017, IEEE Transactions On Image Processing, vol. 26, No. 6, Jun. 2017,pp. 3028-3034.*

Sang Min Yoon et al., "View-based 3D Model Retrieval using Compressive Sensing based Classification," Sep. 4-6, 2011, 7th International Symposium on Image and Signal Processing and Analysis (ISPA 2011),pp. 437-441.*

Jun Hu et al., "Hierarchical Graph Semantic Pooling Network for Multi-modal Community Question Answer Matching," Oct. 15, 2019, MM '19: Proceedings of the 27th ACM International Conference on Multimedia, pp. 1157-1164.*

Saihui Hou et al., "VegFru: A Domain-Specific Dataset for Fine-grained Visual Categorization," Oct. 2017, Proceedings of the IEEE International Conference on Computer Vision (ICCV), 2017, pp. 542-548.*

Notification to Grant Patent Right of the priority application CN202110567940.9.

NPL1: "Disentangling the Response of Vagetation To Rainfall Anomalies for Drought Evaluation Over the Indus Basin", IEEE, by Jie Zhou, Feb. 17, 2021.

NPL2: "A 3D Model Retrieval Approach Based on View Classification", Journal of Image and Graphics, vol. 12, No. 3, Mar. 2007.

NPL3: "View-Invariant Action Recognition Based on Action Graphs", Journal of Software, vol. 20, No. 10, Oct. 2009, pp. 2679-2691.

NPL4: "A brief survey on virtual reality technology", Science & Technology Review, vol. 34, No. 14, 2016.

* cited by examiner

FIG. 1

Inputting an image to be classified into a convolutional neural network feature extractor with multiple stages, and extracting two layers of network feature graphs $X_i$ and $Y_i$ in the last stage — 201

Constructing a hybrid high-order attention module enhanced by a space-gated network according to the network feature graphs $X_i$ and $Y_i$ and forming a high-order feature vector pool according to the hybrid high-order attention module — 202

Using each vector in the high-order feature vector pool as a node to construct a graph neural network, and utilizing the semantic similarity among high-order features to form representative vector nodes in groups — 203

Performing global pooling on the representative vector nodes to obtain classification vectors, and obtaining a fine-grained classification result through a fully connected layer and a classifier based on the classification vectors — 204

FINE-GRAINED IMAGE RECOGNITION METHOD AND APPARATUS USING GRAPH STRUCTURE REPRESENTED HIGH-ORDER RELATION DISCOVERY

CROSS-REFERENCE TO RELATED APPLICATIONS

This application claims priority to Chinese Patent Application No. 202110567940.9, filed on May 24, 2021, which is hereby incorporated by reference in its entirety.

TECHNICAL FIELD

The present disclosure relates to the technical field of image processing, in particular to a fine-grained image recognition method and apparatus using graph structure represented high-order relation discovery.

DISCUSSION OF THE BACKGROUND

Image fine-grained recognition is a technology that summarizes and classifies input images based on a large number of fine-grained classification categories and algorithm recognition. This technology can be widely used in various fields such as Internet analysis, face recognition, pedestrian recognition, and smart cities.

At present, most fine-grained image recognition tends to use regional features or component-level representations to enhance the recognition effect of images. However, this type of method needs to rely on an additional component feature extraction network, and the features extracted by the component are prone to unstable representations, which affects the image recognition effect.

SUMMARY

Embodiments of present disclosure provide a fine-grained recognition method and apparatus using graph structure represented high-order relation discovery, which realize the rapid and accurate extraction of graph features through single stage network representation without relying on an additional component feature extraction network, and improve the image recognition effect.

In the first aspect, embodiments of present disclosure provide a fine-grained image recognition method using graph structure represented high-order relation discovery, including:

inputting an image to be classified into a convolutional neural network feature extractor with multiple stages, and extracting two layers of network feature graphs $X_i$ and $Y_i$ in the last stage;

constructing a hybrid high-order attention module enhanced by a space-gated network according to the network feature graphs $X_i$ and $Y_i$ and forming a high-order feature vector pool according to the hybrid high-order attention module;

using each vector in the high-order feature vector pool as a node to construct a graph neural network, and utilizing semantic similarity among high-order features to form representative vector nodes in groups; and performing global pooling on the representative vector nodes to obtain classification vectors, and obtaining a fine-grained classification result through a fully connected layer and a classifier based on the classification vectors.

In an implementation, the constructing a hybrid high-order attention module enhanced by a space-gated network according to the network feature graphs $X_i$ and $Y_i$ and forming a high-order feature vector pool according to the hybrid high-order attention module, includes:

constructing an attention perception matrix $P_i$ corresponding to the hybrid high-order attention module, according to the network feature graphs $X_i$ and $Y_i$;

merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$; and transposing the position relation matrix $E_i$ and merging the transposed position relation matrix $E_i$ with an encoded network feature graph $Y_i$ to form the high-order feature vector pool.

In an implementation, the constructing an attention perception matrix $P_i$ corresponding to the hybrid high-order attention module, according to the network feature graphs $X_i$ and $Y_i$, includes:

encoding the network feature graph $Y_i$;

determining the attention perception matrix $P_i$ of each position in the hybrid high-order attention module, according to the transposition of the network feature graph $X_i$ and the encoded network feature graph $Y_i$:

$$P_i = \mathcal{N}\left(\mathcal{M}\left(\frac{1}{C}\sum_{i=1}^{C} X_i^T \varphi(Y_i)\right)\right) \in \mathbb{R}^{WH \times TH}$$

wherein, the W and H respectively represent width and height dimensions of the network feature graph, C represents a dimension of the network feature graph, $\mathcal{M}(x) = \text{sign}(x) x^{-1/2}$ represents a matrix normalization method, sign represents symbol positive and negative characteristics of x, $\mathcal{N}(x) = x/\|x\|_2^2$ represents L2 normalization, $\mathbb{R}^{WH \times WH}$ represents a size dimension of the generated vector and T represents a transposition symbol.

In an implementation, the merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$, includes:

performing matrix multiplication on the attention perception matrix $P_i$ and the transposition of the network feature graph $X_i$ to obtain the spatial perception high-order matrix $(P_i X_i^T)$;

constructing the position relation matrix $E_i$, according to the spatial perception high-order matrix $(P_i X_i^T)$:

$$E_i = \mathcal{G}\left(\sum_{c=1}^{C} P_c\right) \cdot (P_i X_i^T) + X_i$$

wherein, the gated network $\mathcal{G}$ is a fully connected layer neural network of a learnable weight with a dimension of $\mathbb{R}^{WH \times 1}$.

In an implementation, the transposing the position relation matrix $E_i$ and merging the transposed position relation matrix $E_i$ with an encoded network feature graph $Y_i$ to form the high-order feature vector pool, includes:

transposing the position relation matrix $E_i$, interacting the transposed position relation matrix $E_i$ with the encoded cross-layer matrix $Y_i$, and averaging it in the WH dimension to obtain the high-order feature vector pool $\mathcal{T}$ with a dimension of $\mathbb{R}^{C_N \times C}$:

$$\mathcal{T} = \mathcal{N}\left(\mathcal{M}\left(\frac{1}{WH}\sum_{i=1}^{WH}\varphi(Y_i)^T E_i\right)\right) \in \mathbb{R}^{C_N \times C}$$

wherein, $C_N$ represents the number of the elements and C represents the dimension of each vector.

In an implementation, the using each vector in the high-order feature vector pool as a node to construct a graph neural network, and utilizing semantic similarity among high-order features to form representative vector nodes in groups, includes:
  using each vector in the high-order feature vector pool as one node to construct a first graph neural network, and constructing an adjacency matrix according to the semantic similarity to extract a graph embedding feature matrix;
  determining a grouping mapping rule from high-dimensional nodes to low-dimensional nodes, according to a second graph neural network; and
  grouping nodes according to the grouping mapping rule and the graph embedding feature matrix to obtain the representative vector nodes.

In an implementation, the using each vector in the high-order feature vector pool as one node to construct a first graph neural network and constructing an adjacency matrix according to the semantic similarity to obtain a graph embedding feature matrix, includes:
  decomposing vectors in the vector pool into $C_N$ vector combinations a dimension of C, and using each vector with the dimension of C as one feature node to construct a first adjacency matrix $A_{i,j}$ of the first graph neural network:

$$A_{i,j} = \frac{\tau(x_i)^T \cdot \tau(x_j)}{\|\tau(x_i)\|\|\tau(x_j)\|}$$

wherein, $A_{i,j}$ represents a connection relationship between the i-th node and the j-th node, and $\tau(x_i)$ represents encoding a vector $x_i$ in the vector pool using $\tau$ coding;
adding a self-loop operation to the first adjacency matrix $A_{i,j}$ to obtain a second adjacency matrix $\tilde{A}$;
the second adjacency matrix $\tilde{A}$ is:

$$\tilde{A} = A_{i,j} + I$$

wherein, $I \in \mathbb{R}^{C_N \times C_N}$ is expressed as an identity matrix with a diagonal of 1;
constructing a likelihood-constrained graph fusion algorithm according to the second adjacency matrix to obtain a graph embedding feature matrix H:

$$H = \text{ReLU}\left(\tilde{D}^{\frac{1}{2}} \tilde{A} \tilde{D}^{\frac{1}{2}} T W^g\right)$$

wherein, $W^g \in \mathbb{R}^{C \times d_h}$ represents a learnable parameter of the first graph neural network, $d_h$ represents a feature dimension after network transformation, T represents a matrix form of the above-mentioned high-order feature vector pool, ReLU represents a rectified linear unit and $$\tilde{D} = \sum_j \tilde{A}_{i,j}$$

represents a diagonal matrix.

In an implementation, the determining a grouping mapping rule from high-dimensional nodes to low-dimensional nodes according to a second graph neural network, includes:
  according to the second graph neural network, mapping $C_N$ nodes to be $C_r$ nodes to obtain a mapping relationship $\mathbb{R}^{C_N \times d_h} \to \mathbb{R}^{C_r \times d_h}$;
  wherein, a grouping mapping rule matrix G from high-dimensional nodes to low-dimensional nodes is:

$$G = \text{ReLU}\left(\tilde{D}^{\frac{1}{2}} \tilde{A} \tilde{D}^{\frac{1}{2}} H W^{emb}\right)$$

wherein, $W^{emb} \in \mathbb{R}^{d_h \times C_r}$ represents a learnable matrix of the second graph neural network.

In an implementation, the grouping nodes according to the grouping mapping rule and the graph embedding feature matrix to obtain the representative vector nodes, includes:
  according to the grouping mapping rule, clustering the convolutional graph embedding feature matrix H into a new graph of $C_r$ nodes to form the representative vector nodes Z:

$$Z = H^T \frac{e^{G_{i,j}}}{\sum_{j=1}^{C_r} e^{G_{i,j}}} \in \mathbb{R}^{d_h \times C_r}.$$

In the second aspect, embodiments of the present disclosure provide a fine-grained recognition image apparatus using graph structure represented high-order relation discovery, including:
  an extracting module configured to input an image to be classified into a convolutional neural network feature extractor with multiple stages, and extract two layers of network feature graphs $X_i$ and $Y_i$ in the last stage;
  a first forming module configured to construct a hybrid high-order attention module enhanced by a space-gated network according to the two layers of network feature graphs $X_i$ and $Y_i$, and form a high-order feature vector pool according to the hybrid high-order attention module;
  a second forming module configured to use each vector in the high-order feature vector pool as a node to construct a graph neural network, and utilize a semantic similarity among high-order features to form representative vector nodes in groups; and
  an obtaining module configured to perform global pooling on the representative vector nodes to obtain classification vectors, and obtain a fine-grained classification result through a fully connected layer and a classifier based on the classification vectors.

In the third aspect, embodiments of the present disclosure provide a fine-grained image recognition device using graph structure represented high-order relation discovery, including:
  at least one processor and a memory;
  the memory stores computer execution instructions;
  the at least one processor executes the computer-executable instructions stored in the memory, so that the at least one processor executes the fine-grained image recognition method using graph structure represented high-order relation discovery in any one item of the above-mentioned first aspect.

In the fourth aspect, embodiments of the present disclosure provide a computer-readable storage medium having computer-executable instructions stored therein, and the computer-executable instructions are executed by a processor for implementing the fine-grained image recognition method using graph structure represented high-order relation discovery in any one item of the above-mentioned first aspect.

In the fifth aspect, embodiments of the present disclosure provide a computer program product including a computer program which implements the fine-grained image recognition method using graph structure represented high-order relation discovery in any one item of the above-mentioned first aspect while being executed.

Embodiment of the present disclosure provide the fine-grained image recognition method and apparatus using graph structure represented high-order relation discovery, including: inputting the image to be classified into a convolutional neural network feature extractor with multiple stages and extracting two layers of network feature graphs $X_i$ and $Y_i$ in the last stage, constructing a hybrid high-order attention module enhanced by a space-gated network according to the network feature graphs $X_i$ and $Y_i$, forming a high-order feature vector pool based on the hybrid high-order attention module, using each vector in the high-order feature vector pool as a node to construct a graph neural network, and utilizing the semantic similarity among high-order features to form representative vector nodes in groups, and performing global pooling on the representative vector nodes to obtain classification vectors, and obtaining a fine-grained classification result through a fully connected layer and a classifier based on the classification vectors. Selecting the feature graphs in the last stage with lower resolution reduces the sensitivity of the network output to displacement and deformation. Constructing the hybrid high-order attention module can enhance the feature aggregation. By constructing a gated network, it is possible to learn a dependency relationship with relatively longer span and avoid the problems of gradient disappearance and gradient explosion. By grouping the nodes to form representative vector nodes, similar nodes can be classified in a group and the calculation time can be shortened. Without relying on an additional component feature extraction network, the rapid and accurate extraction of image features can be realized through single stage network representation. Constructing the relation relationship among image features using the information of the image itself obtains the fine representation of fine-grained features and improves the image recognition effect.

BRIEF DESCRIPTION OF THE DRAWINGS

The drawings herein are incorporated into the specification and constitute a part of the specification, which show embodiments in accordance with the present disclosure and are used to explain the principle of the present disclosure together with the specification.

Through the above-mentioned drawings, the specific embodiments of the present disclosure have been shown, which will be described in more detail below. These drawings and text descriptions are not intended to limit the scope of the inventive concept in any way, but to explain the concept of the disclosure to those skilled in the art by referring to specific embodiments.

DETAILED DESCRIPTION OF EMBODIMENTS

The exemplary embodiments will be described in detail here with examples thereof shown in the accompanying drawings. When the following description refers to the drawings, unless otherwise indicated, the same numbers in different drawings indicate the same or similar elements. The implementations described in the following exemplary embodiments do not represent all implementations consistent with the present disclosure. On the contrary, they are merely examples of apparatus and method consistent with some aspects of the present disclosure described in detail in the appended claims.

The technical solutions of the present disclosure and how the technical solutions of the present disclosure solve the above technical problems will be described in detail below with specific embodiments. The following specific embodiments can be combined with each other, and the same or similar concepts or processes may not be repeated in some embodiments.

The following explains an application scenario provided by an embodiment of the present disclosure: the solution provided by the embodiment of the present disclosure relates to fine-grained image recognition. Traditional image recognition generally recognizes different types of species such as plants and animals, while fine-grained image recognition can recognize different sub-categories of the same type of object, thus can be applied to computer vision systems in many fields such as national defense, film production, and public security, and has a wide range of application prospects.

In some technologies, a company has proposed a cyclic attention-guided convolutional neural network. Through a sub-network of fine classification and an attention candidate network, the differences in classification labeling are used to gradually explore the region with more impact on classification. The method finally explores the effectively distinguished regional features through the fusion of multi-level network modules and the difference in probability distribution, and merges them with the global features to improve the accuracy of fine-grained classification. This method requires additional image component labeling information, but the additional image component labeling information has the inaccuracy and may affect the recognition effect of the image.

In other technologies, a university has proposed a sampling structure based on salient regions, which realizes accurate understanding of salient regions by embedding an improved network layer in a general model. The algorithm performs grid transformation on the predicted regions by using the salient region features, to obtain a high-resolution image after sampling, which is fused with traditional classification features to achieve high-precision classification of regional details. However, this method needs to rely on an additional component feature extraction network, and the features extracted by the component are prone to unstable representations, which affects the image recognition effect.

Hence, the embodiment of the present disclosure provides a fine-grained image recognition method using graph structure represented high-order relation discovery. Based on the deep network multi-feature extraction, a high-order feature vector pool is constructed using a hybrid high-order mode enhanced by network gating. On the basis of this, through using the semantic grouping-constrained graph network structure, the high-dimensional representation is grouped and reduced in dimension to obtain a simplified low-dimensional representation, and finally the classification operation is performed through a learnable residual classifier. Without relying on additional component feature extraction network, the method realizes the rapid and accurate extraction of image features through single stage network representation, and constructs a relation relationship among image features using the information of the image itself, which realizes the fine representation of the fine-grained features and improves the image recognition effect.

Figure 1:
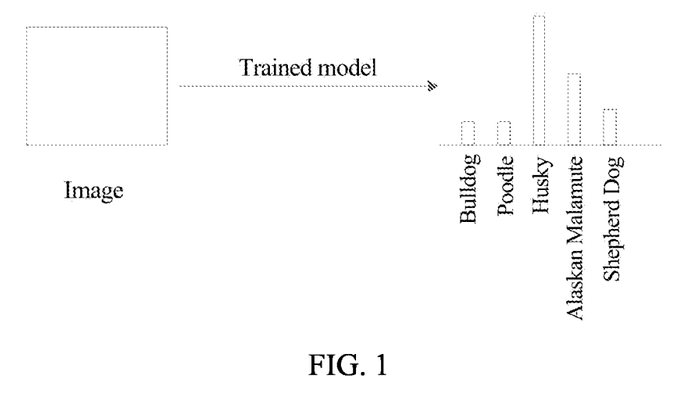
FIG. 1 is a schematic diagram of an application scenario provided by an embodiment of the present disclosure.

FIG. 1 is a schematic diagram of an application scenario provided by an embodiment of the present disclosure. As shown in FIG. 1, an animal image with the image information of the species dog is input into a trained model. After a series of calculation processes, the probability of outputting the image as a husky is the greatest, so the species of the dog in the image is identified as a husky.

With reference to the following drawings, some embodiments of the present disclosure will be described in detail. The following embodiments and the features thereof can be combined with each other when there is no conflict among the embodiments.

Figure 2:
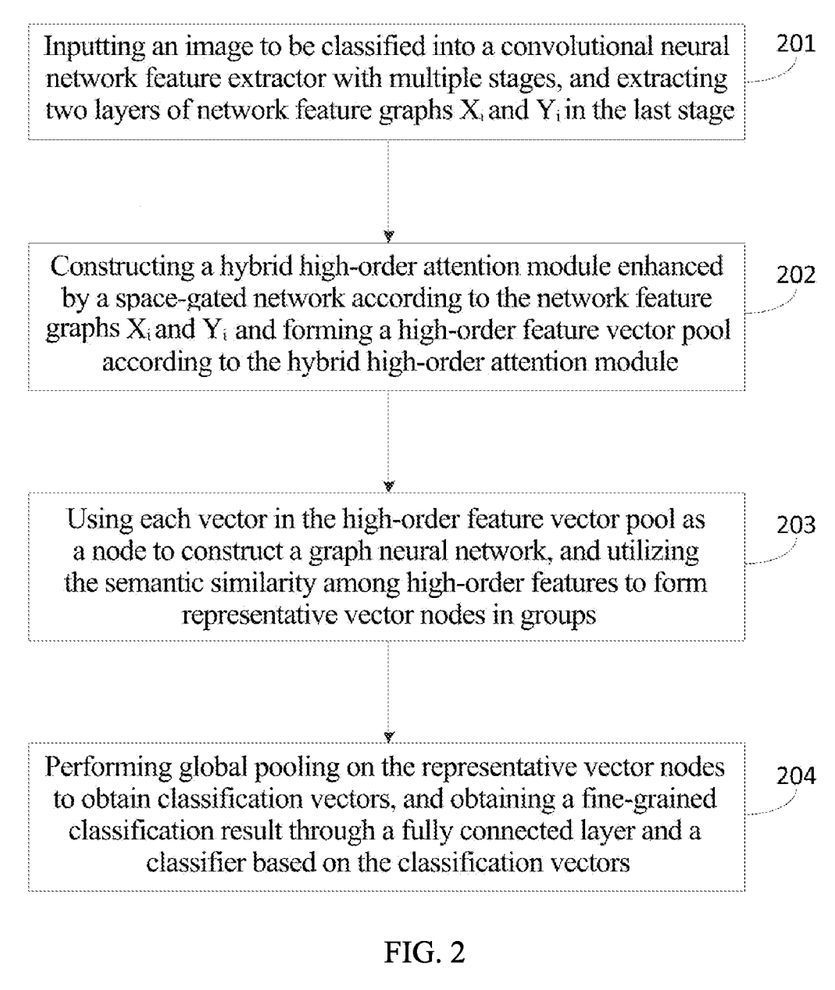
FIG. 2 is a schematic flow diagram of a fine-grained image recognition method using graph structure represented high-order relation discovery provided by an embodiment of the present disclosure.

FIG. 2 is a schematic flow diagram of a fine-grained image recognition method using graph structure represented high-order relation discovery provided by an embodiment of the present disclosure. As shown in FIG. 2, the method in this embodiment may include:

Step 201. Inputting an image to be classified into a convolutional neural network feature extractor with multiple stages, and extracting two layers of network feature graphs $X_i$ and $Y_i$ in the last stage.

Wherein, the multiple stages can be four stages. The convolutional neural network feature extractor can adopt ResNet of different architectures and multiple variant networks, such as ResNeXt and SE-Net, etc. The network feature graphs can also be called cross-layer features.

In an implementation, the resolutions of the network feature graphs in respective stages can be different, and the resolution of the network feature graph gradually decreases towards the last stage.

The convolutional neural network feature extractor can be used to extract feature backbone network of the image to be classified to extract two layers of network feature graphs $X_i$ and $Y_i$ in the last stage. In an implementation, the second and third layers of the network feature graphs to the last layer in the last stage can be extracted. In an implementation, the length and width of network feature graphs $X_i$ and $Y_i$ in the last stage can be the ⅟₃₂ of the original image to be classified, and the number of channels is 2048. For example, when the dimensions of length and width of the input image are 32×32, the dimensions of length and width of the feature maps in the last stage are 1×1.

Step 202. Constructing a hybrid high-order attention module enhanced by a space-gated network according to the network feature graphs $X_i$ and $Y_i$ and forming a high-order feature vector pool according to the hybrid high-order attention module.

Wherein, the gated network, also called the gated mechanism, is used to control the transmission of information in the neural network, that is, to control how much information needs to be retained and how much information needs to be discarded. The gated network is a kind of spatial fusion weight learned during the training process.

The hybrid high-order attention module can be constructed through the network feature graphs $X_i$ and $Y_i$ and the high-order feature vector pool can be formed through the high-order attention module enhanced by the gated network, realizing the fine-grained representation mode.

Step 203. Using each vector in the high-order feature vector pool as a node to construct a graph neural network, and utilizing the semantic similarity among high-order features to form representative vector nodes in groups.

By using each vector in the high-order feature vector pool as a node, the nodes with the same number of the vectors in the high-order feature vector pool are obtained, and the graph neural network is constructed to obtain the connection relationship of respective nodes; by utilizing the semantic similarity among high-order features, graph learning and fusion are performed according to the likelihood of semantic similarity, and nodes with relation relationship are aggregated together to form representative vector nodes in groups.

Step 204. Performing global pooling on the representative vector nodes to obtain classification vectors, and obtaining a fine-grained classification result through a fully connected layer and a classifier based on the classification vectors.

In an implementation, global pooling can be classified as global maximum pooling and global average pooling. The global maximum pooling is to select the maximum value in the feature graphs, and the global average pooling is to select the average value in the feature graphs.

Classification vectors are obtained by performing global pooling on the representative vector nodes and the final fine-grained classification result can be obtained through the fully connected layer and the classifier according to a probability of the existence of each feature in the classification vectors. Wherein, the greater the probability of a certain feature is, the image is more likely to be considered as a representation of the feature.

The model of the fine-grained image recognition method using graph structure represented high-order relation discovery may be a pre-trained model. Specifically, specific animal or plant images can be used to train the model parameters of the fine-grained image recognition method using graph structure represented high-order relation discovery, where each training sample is a specific species type and the target variable can be the maximum probability for obtaining the species type. In the training process, the variables in the model can be adjusted to obtain the most realistic results. After the trained model is obtained, it can be determined that which species a certain image belongs to, based on the trained model.

The fine-grained image recognition method using graph structure represented high-order relation discovery provided by the present embodiment includes: inputting the image to be classified into a convolutional neural network feature extractor with multiple stages to extract two layers of network feature graphs $X_i$ and $Y_i$ in the last stage, constructing a hybrid high-order attention module enhanced by a space-gated network according to the network feature graphs $X_i$ and $Y_i$ forming a high-order feature vector pool according to the hybrid high-order attention module, using each vector in the high-order feature vector pool as a node to construct a graph neural network, utilizing the semantic similarity among high-order features to form representative vector nodes in groups, performing global pooling on the representative vector nodes to obtain classification vectors, and obtaining a fine-grained classification result through a fully connected layer and a classifier based on the classification vectors. Selecting the feature graphs in the last stage with lower resolution reduces the sensitivity of the network output to displacement and deformation. The construction of a hybrid high-order attention module can enhance the feature aggregation. By constructing a gated network, it is possible to learn a dependency relationship with relatively longer span and avoid the problems of gradient disappearance and gradient explosion. By grouping the nodes to form representative vector nodes, similar nodes can be classified in a group and the calculation time can be shortened. Without relying on additional component feature extraction network, this method realizes the rapid and accurate extraction of image feature through single stage network representation. Constructing the relation relationship among image features using the information of the image itself obtains fine representation of fine-grained features and improves the image recognition effect.

On the basis of the technical solutions provided in the foregoing embodiments, In an implementation, constructing a hybrid high-order attention module enhanced by the spatial gated network according to the network feature graphs $X_i$ and $Y_i$ and forming a high-order feature vector pool according to the hybrid high-order attention module, includes:

constructing an attention perception matrix $P_i$ corresponding to the hybrid high-order attention module, according to the network feature graphs $X_i$ and $Y_i$; merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$; and transposing the position relation matrix $E_i$ and merging the transposed position relation matrix $E_i$ with an encoded network feature graph $Y_i$ to form the high-order feature vector pool.

Wherein, the spatial perception high-order matrix, also called spatial relation construction, is constructed by two layers of feature network graphs. The position relation matrix is also called enhanced feature matrix.

By constructing the attention perception matrix, the gated network and the position relation matrix to form the high-order feature vector pool, the feature aggregation can be enhanced, avoiding the gradient disappearance and gradient explosion and treating the role of each evaluation element in the overall evaluation differently.

In an implementation, constructing an attention perception matrix $P_i$ corresponding to the hybrid high-order attention module, according to the network feature graphs $X_i$ and $Y_i$, includes:

encoding the network feature graph $Y_i$; determining the attention perception matrix $P_i$ of each position in the hybrid high-order attention module, according to the transposition of the network feature graph $X_i$ and the encoded network feature graph $Y_i$:

$$P_i = \mathcal{N}\left(\mathcal{M}\left(\frac{1}{C}\sum_{i=1}^{C} X_i^T \varphi(Y_i)\right)\right) \in \mathbb{R}^{WH \times TH}$$

wherein, the W and H respectively represent the width and height dimensions of the network feature graph, C represents the dimension of the network feature graph, $\mathcal{M}(x) = \text{sign}(x) x^{-1/2}$ represents the matrix normalization method, sign represents the symbol positive and negative characteristics (1 or −1) of x, $\mathcal{N}(x) = x/\|x\|_2^2$ represents the L2 normalization, $\mathbb{R}^{WH \times WH}$ represents the size dimension of the generated vector, and T represents the transposition symbol.

Wherein C can be the number of channels, such as 2048.

Wherein, by encoding the network feature graph $X_i$ through a 1×1 convolution kernel, the $\varphi$ encoded network feature graph $Y_i$ is obtained as $\varphi(Y_i)$.

The width and height dimensions of the network feature graphs $X_i$ and $Y_i$ can be combined to obtain the dimensions of the network feature graphs $X_i$ and $Y_i$ as WH×C, when the transposition of the network feature graph $X_i$ and the $\varphi$ encoded network feature graph $Y_i$ is multiplied, the obtained dimension is WH×WH.

By utilizing the transposition of the network feature graph $X_i$ and the encoded network feature graph $Y_i$ after $\varphi$ coding, the attention perception matrix $P_i$ is determined, which can enhance feature aggregation and improve the utilization of features.

In an implementation, merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$, includes:

performing matrix multiplication on the attention perception matrix $P_i$ and the transposition of the network feature graph $X_i$ to obtain the spatial perception high-order matrix $(P_i X_i^T)$;

constructing the position relation matrix $E_i$, according to the spatial perception high-order matrix:

$$E_i = \mathcal{G}\left(\sum_{c=1}^{C} P_c\right) \cdot (P_i X_i^T) + X_i$$

wherein, the gated network $\mathcal{G}$ is a fully connected layer neural network of a learnable weight with a dimension of $\mathbb{R}^{WH \times 1}$.

On the basis of the attention perception matrix $P_i$, the gated mechanism is selected, the spatial fusion weight $$\mathcal{G}\left(\sum_{c=1}^{C} P_c\right)$$

is automatically learned, a self-adaptive fusion parameter is learned, and then fused with the spatial perception high-order matrix $(P_i X_i^T)$ to obtain the position relation matrix $E_i$. The value of i is from 1 to C.

In an implementation, the learnable weight of $\mathcal{G}$ can be determined through the training stage.

By learning the gated network, and selecting appropriate information for processing, the learning of a dependency relationship with relatively longer span is realized, avoiding the problems of gradient disappearance and gradient explosion.

In an implementation, transposing the position relation matrix $E_i$, and merging the transposed position relation matrix $E_i$ with the encoded network feature graph $Y_i$ to form the high-order feature vector pool, includes:

transposing the position relation matrix $E_i$, interacting the transposed position relation matrix $E_i$ with the encoded cross-layer matrix $Y_i$, and averaging it in the WH dimension to obtain the high-order feature vector pool $\mathcal{T}$ with a dimension of $\mathbb{R}^{C_N \times C}$:

$$\mathcal{T} = \mathcal{N}\left(\mathcal{M}\left(\frac{1}{WH}\sum_{i=1}^{WH}\varphi(Y_i)^T E_i\right)\right) \in \mathbb{R}^{C_N \times C}$$

wherein, $C_N$ represents the number of the elements and C represents the dimension of each vector;

wherein, $E_i \in \mathbb{R}^{WH \times C}$, $\varphi(Y_i) \in \mathbb{R}^{WH \times C}$, when the $\varphi(Y_i)$ is transposed and then multiplied with $E_i$, a vector with a dimension of $\mathbb{R}^{C \times C}$ is obtained, and by reducing the vector dimension C in $E_i$ to a vector dimension $C_N$, the dimension of the obtained vector pool is $C_N \times C$.

By transposing the relation matrix $E_i$ and merging the transposed relation matrix $E_i$ with the encoded network feature graph $Y_i$ to construct a hybrid high-order feature vector pool, and averaging it in the WH dimension, to obtain the vector pool $\mathcal{T}$ with a dimension of $\mathbb{R}^{C_N \times C}$, wherein, $C_N$ is the number of the elements and C is the dimension of each vector.

By constructing a high-order feature vector pool, the fine-grained representation of the original image is obtained, and the fine-grained features in the image are extracted to facilitate the recognition of the image.

Figure 3:
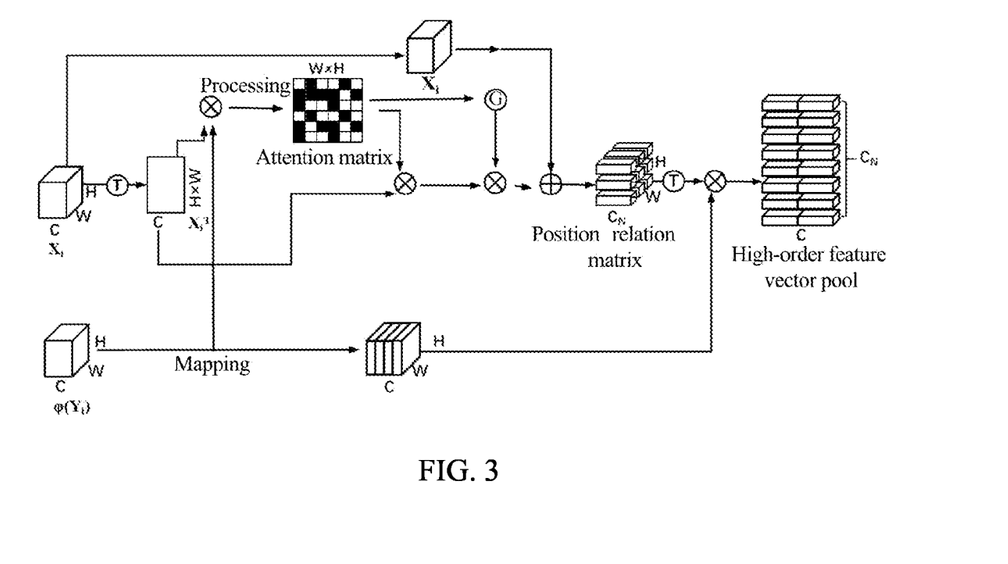
FIG. 3 is a principle schematic diagram of constructing a high-order feature vector pool provided by an embodiment of the present disclosure.

FIG. 3 is a principle schematic diagram of constructing a high-order feature vector pool provided by an embodiment of the present disclosure. As shown in FIG. 3, T represents transposition, by multiplying the transposed network feature graph $X_i$ and the $\varphi$ encoded network feature graph $Y_i$ matrix for processing, an attention matrix $P_i$ with dimension of WH×WH is obtained. The attention matrix $P_i$ obtains self-adaptive fusion parameters by learning the gated network $\mathcal{G}$. By multiplying the transposed network feature graph $X_i$ and the attention matrix $P_i$, the high-order feature $(P_i X_i^T)$ is constructed; then by multiplying it with the gated network $\mathcal{G}$, and adding it to the network feature graph $X_i$, the position relation matrix $E_i$ is obtained.

The matrix multiplication is performed on the transposed position relation matrix $E_i$ and a vector matrix obtained by mapping the $\varphi$ encoded feature $\varphi(Y_i)$ to construct a high-order feature vector pool, where $C_N$ is the number of the elements and C is the dimension of each vector.

In an implementation, using each vector in the high-order feature vector pool as a node to construct the graph neural network, and utilizing the semantic similarity among high-order features to form representative vector nodes in groups, includes:

using each vector in the high-order feature vector pool as one node to construct a first graph neural network and constructing an adjacency matrix according to the semantic similarity to extract a graph embedding feature matrix; constructing a second graph neural network, and determining a grouping mapping rule from high-dimensional nodes to low-dimensional nodes; grouping nodes according to the grouping mapping rule and the graph embedding feature matrix to obtain the representative vector nodes.

In an implementation, using each vector in the high-order feature vector pool as a node to construct a first graph neural network and constructing an adjacency matrix according to the semantic similarity to extract a graph embedding feature matrix; utilizing the second graph neural network to learn the grouping mapping rule from high-dimensional nodes to low-dimensional nodes; and grouping nodes according to the grouping mapping rule and the graph embedding feature matrix to obtain the representative vector nodes.

By grouping the nodes in the high-order feature vector pool to reduce the dimension, the nodes with higher similarity are classified into one category, and the calculation efficiency is improved.

In an implementation, using each vector in the high-order feature vector pool as a node to construct the first graph neural network and constructing the adjacency matrix according to the semantic similarity to extract the graph embedding feature matrix, includes:

decomposing the vectors in the vector pool into $C_N$ vector combinations with the dimension of C, and using each vector with the dimension of C as one feature node to construct a first adjacency matrix $A_{i,j}$ of the first graph neural network:

$$A_{i,j} = \frac{\tau(x_i)^T \cdot \tau(x_j)}{\|\tau(x_i)\|\|\tau(x_j)\|}$$

wherein, $A_{i,j}$ represents a connection relationship between the i-th node and the j-th node, and $\tau(x_i)$ represents encoding a vector $x_i$ in the vector pool using $\tau$ coding;

adding a self-loop operation to the first adjacency matrix $A_{i,j}$ to obtain a second adjacency matrix $\tilde{A}$;

the second adjacency matrix $\tilde{A}$ is:

$$\tilde{A} = A_{i,j} + I$$

wherein, $I \in \mathbb{R}^{C_N \times C_N}$ is a diagonal matrix and expressed as an identity matrix with a diagonal of 1;

constructing a likelihood-constrained graph fusion algorithm according to the second adjacency matrix to obtain a graph embedding feature matrix H:

$$H = \text{ReLU}\left(\tilde{D}^{\frac{1}{2}} \tilde{A} \tilde{D}^{\frac{1}{2}} T W^g\right)$$

wherein, $W^g \in \mathbb{R}^{C \times d_h}$ represents a learnable parameter of the first graph neural network, $d_h$ represents a feature dimension after network transformation, T represents the matrix form of the above-mentioned high-order feature vector pool, ReLU represents a rectified linear unit and $$\tilde{D} = \sum_j \tilde{A}_{i,j}$$

represents a diagonal matrix.

The vectors in the vector pool are decomposed into $C_N$ vector combinations $\mathcal{T} = \{x_1, \ldots, x_{C_N}\}$ with the dimension of C, each vector with the dimension of C is used as one feature node, and the total number of nodes is $C_N$. Wherein, the dimension of H is $H \in \mathbb{R}^{C_N \times d_h}$.

Wherein, the value range of the elements in the first adjacency matrix $A_{i,j}$ is between 0 and 1, which represents the strength of the connection relationship between the i-th node and the j-th node, and when the elements in the first adjacency matrix $A_{i,j}$ are 1, there exists the strongest connection relationship between the i-th node and the j-th node; while the elements in the $A_{i,j}$ are 0, there is no connection relationship between the i-th node and the j-th node. $\tau(x_i)$ represents encoding the vector $x_i$ in the vector pool using $\tau$ coding, that is to perform a 1×1 convolution to the vector $x_i$ in the vector pool, which is used for linear transformation for features.

$$\tilde{D} = \sum_j \tilde{A}_{i,j}$$

is a diagonal matrix, operated for summing the matrix $\tilde{A}$ in the column direction and placing the elements sum on the diagonal of the matrix. $W^g \in \mathbb{R}^{C \times d_h}$ is a learnable parameter obtained in the training process.

By constructing the first graph neural network model, the adjacency matrix is constructed to extract the graph embedding feature matrix, and the connection relationship of each node and the similarity relationship is obtained.

In an implementation, constructing a second graph neural network, and determining the grouping mapping rule from high-dimensional nodes to low-dimensional nodes includes:

according to the second graph neural network, mapping $C_N$ nodes to be $C_r$ nodes to obtain a mapping relationship $\mathbb{R}^{C_N \times d_h} \to \mathbb{R}^{C_r \times d_h}$;

wherein, the grouping mapping rule matrix G from high-dimensional nodes ($C_N$ nodes) to low-dimensional nodes ($C_r$ nodes) is:

$$G = \text{ReLU}\left(\tilde{D}^{-\frac{1}{2}} \tilde{A} \tilde{D}^{-\frac{1}{2}} H W^{emb}\right)$$

wherein, $W^{emb} \in \mathbb{R}^{d_h \times C_r}$ represents a learnable matrix of the second graph neural network.

Wherein, the mapping rule matrix is also called aggregating rule matrix. $W^{emb} \in \mathbb{R}^{d_h \times C_r}$ is the learnable matrix obtained during the training process, $G \in \mathbb{R}^{C_N \times C_r}$.

Through the second graph neural network relationship, $C_N$ nodes in the high-order feature vector pool are mapped to be $C_r$ nodes; $C_r$ is the number of features after dimension reduction, usually set as $\lfloor C_N/r \rfloor$, the $\lfloor \ \rfloor$ represents rounding and r can be set according to actual needs, such as 2. That is to learn the mapping relationship of the vector feature pool from $\mathbb{R}^{C_N \times d_h} \to \mathbb{R}^{C_r \times d_h}$.

In an implementation, the number of the preset vector nodes can be set in advance, which is a fraction of the nodes in the high-order feature vector pool. For example, the number of nodes in the high-order feature vector pool is 8, and r=2 is set, then the number of nodes in the high-order feature vector pool becomes ½ of the original, and 4 nodes are obtained after interacting with the second graph neural network. If the number of nodes in the high-order feature vector pool is 9, and r=2 is set, then the number of nodes in the high-order feature vector pool becomes ½ of the original, and 4 nodes are still obtained after interacting with the second graph neural network and rounding.

By performing dimension reduction processing on the nodes in the high-order vector pool, the nodes with similar semantics are classified into one category, reducing the data dimension and the required storage space.

In an implementation, grouping nodes according to the grouping mapping rule and the graph embedding feature matrix to obtain the representative vector nodes, includes:

according to the grouping mapping rule, clustering the convolutional graph embedding feature matrix H into a new graph of $C_r$ nodes to form the representative vector nodes Z:

$$Z = H^\top \frac{e^{G_{i,j}}}{\sum_{j=1}^{C_r} e^{G_{i,j}}} \in \mathbb{R}^{d_h \times C_r}$$

wherein, $$\frac{e^{G_{i,j}}}{\sum_{j=1}^{C_r} e^{G_{i,j}}}$$

indicates that the SoftMax calculation is performed on the $C_r$ nodes in the vector pool to obtain the probability value of a feature in the vector pool, and the dimension of $C_N \times C_r$ is obtained after the calculation is completed. $H \in \mathbb{R}^{C_N \times d_h}$, the transposed H is multiplied with $$\frac{e^{G_{i,j}}}{\sum_{j=1}^{C_r} e^{G_{i,j}}},$$

and the obtained dimension is $d_h \times C_r$.

By reducing dimension C to dimension $C_N$, reducing the dimension $C_N$ and dimension C in $C_N \times C$ to dimension $d_h$ and $C_r$ respectively realizes the dimension reduction from high-dimensional nodes to low-dimensional nodes, which effectively alleviates the difficulty of optimization of high-dimensional space, saves calculation time of model training, and improves the accuracy of the algorithm.

The maximum or average pooling operation is performed on the representative vector nodes Z after grouping and dimension reduction, and the residual link is made with the graph embedding feature matrix H to obtain the optimized feature $\tilde{Z}=Z+H$. The optimized feature goes through a fully connected layer network and classifier, and the final fine-grained image classification probability is obtained. The classification category with the highest probability is the fine-grained classification result.

In the embodiment of the present disclosure, the learnable parameter, learnable weights, and so on in the foregoing parts may be determined through a training process. The implementation principle of the specific training method can refer to the conventional model training principle, which will not be repeated here.

Figure 4:
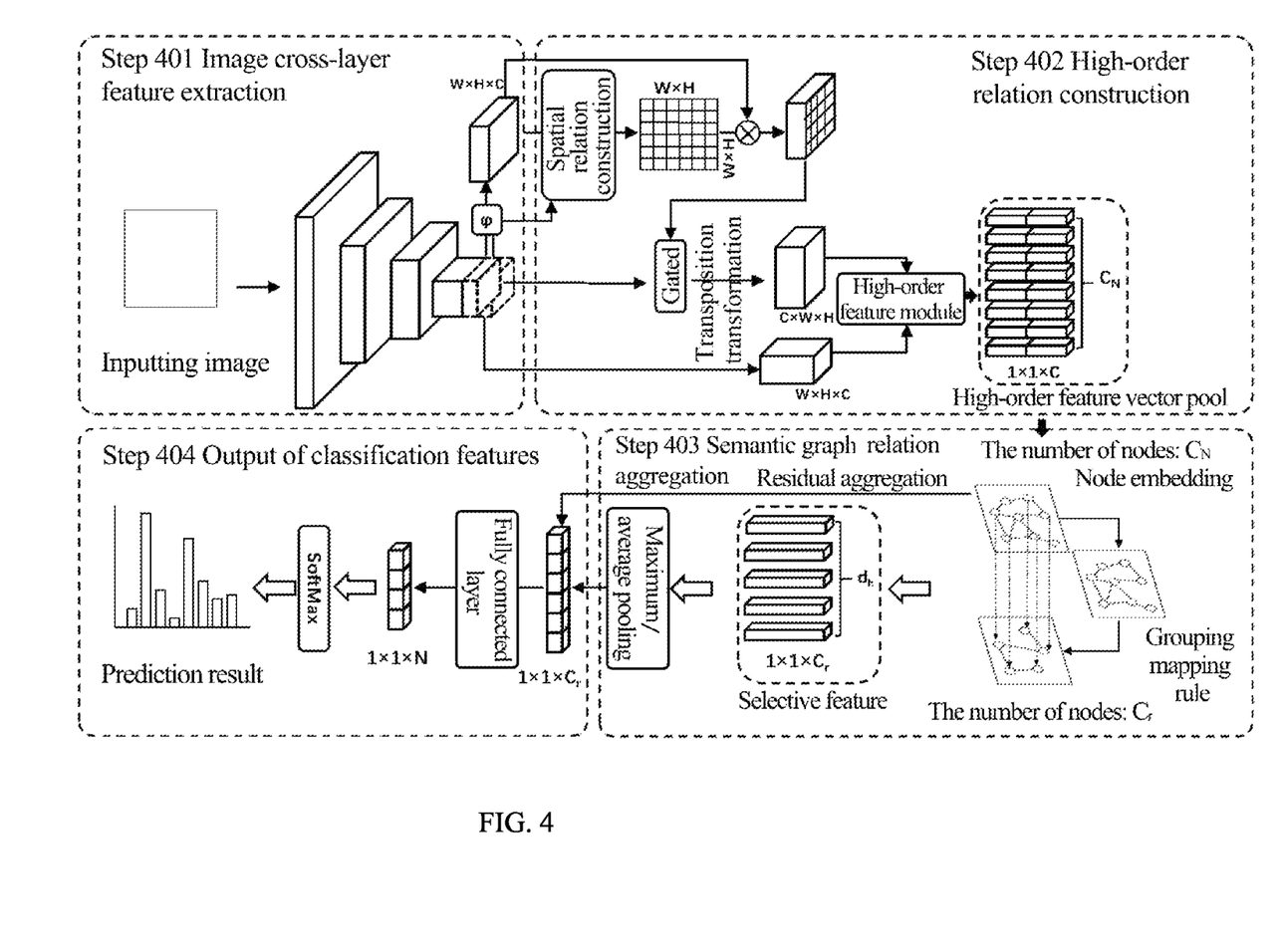
FIG. 4 is a principle schematic diagram of a fine-grained image recognition method using graph structure represented high-order relation discovery provided by an embodiment of the present disclosure.

FIG. 4 is a schematic diagram of the principle of a fine-grained image recognition method using graph structure represented high-order relation discovery provided by an embodiment of the present disclosure. As shown in FIG. 4:

Step 401 Image Cross-Layer Feature Extraction.

The image is input, a convolutional neural network feature extractor is used to extract a backbone network of the image, and the second and third layers of the network feature graphs $X_i$ and $Y_i$ to the last layer in the last stage are extracted. Wherein, the dimension of the feature network graphs $X_i$ and $Y_i$ is W×H×C, W represents the width dimension of the feature network graph, H represents the height dimension of the feature network graph, and C represents the channel dimension of the feature network graph. 1×1 convolution is performed on the feature network graph $Y_i$ to obtain the encoded feature network graph $Y_i$ after φ coding.

Step 402 High-Order Relation Construction.

According to the transposition of the network feature graph $X_i$ and the encoded network feature graph $Y_i$ after φ coding, the spatial relation construction is realized. The attention perception matrix $P_i$ of the dimension WH×WH is determined, the attention perception matrix $P_i$ and the transposition of the network feature graph $X_i$ are subjected to matrix multiplication to obtain the spatial perception high-order matrix $(P_i X_i^T)$, and then the position relation matrix $E_i$ is determined by constructing with the gated network, after the position relation matrix $E_i$ is transposed and deformed, it is interacted with the encoded cross-layer matrix $Y_i$, and averaged in the WH dimension to obtain the high-order feature module with a dimension of $\mathbb{R}^{C_N \times C}$, and thereby obtaining high-order vector pool $\mathcal{T}$.

Step 403 Semantic Graph Relation Aggregation.

The vectors in the high-order feature vector pool are decomposed into $C_N$ vector combinations with the dimension of C, and each vector with the dimension of C is used as one feature node, a first adjacency matrix $A_{i,j}$ is constructed according to the first graph neural network through node embedding; a self-loop operation is added to the first adjacency matrix $A_{i,j}$ to obtain a second adjacency matrix $\tilde{A}$; a likelihood-constrained graph fusion algorithm is constructed according to the second adjacency matrix to obtain a graph embedding feature matrix H with $C_N$ nodes; the convolutional graph embedding feature matrix H is mapped into a network feature graph of $C_r$ nodes according to the grouping mapping rule G, then 1×1×C is formed by utilizing feature aggregation to obtain $d_h$ selective features of dimension $C_r$, i.e., the representative vector nodes Z.

Step 404 Output of Classification Features.

The maximum or average pooling operation is performed on the representative vector nodes Z after grouping and dimension reduction, and the residual aggregation is made with the graph embedding feature matrix H to obtain the optimized feature $\tilde{Z}=Z+H$, and its dimension is 1×1×$C_r$. Then through a fully connected layer network and classifier, the feature with the dimension of 1×1×N is obtained. The probability of a certain feature is selected by using the SoftMax function to get the final prediction result.

Figure 5:
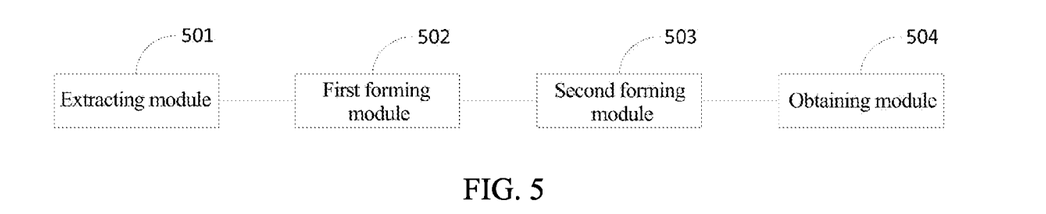
FIG. 5 is a schematic structural diagram of a fine-grained image recognition apparatus using graph structure represented high-order relation discovery provided by an embodiment of the present disclosure.

FIG. 5 is a schematic structural diagram of a fine-grained image recognition apparatus using graph structure represented high-order relation discovery provided by an embodiment of the present disclosure. As shown in FIG. 5, the fine-grained image recognition apparatus using graph structure represented high-order relation discovery provided by this embodiment may include:

- an extracting module 501 configured to input an image to be classified into a convolutional neural network feature extractor with multiple stages and extract two layers of network feature graphs $X_i$ and $Y_i$ in the last stage;
- a first forming module 502 configured to construct a hybrid high-order attention module enhanced by the space-gated network according to the two layers of network feature graphs $X_i$ and $Y_i$ and form a high-order feature vector pool according to the hybrid high-order attention module;
- a second forming module 503 configured to use each vector in the high-order feature vector pool as a node to construct a graph neural network and utilize a semantic similarity among high-order features to form representative vector nodes in groups;
- an obtaining module 504 configured to perform global pooling on the representative vector nodes to obtain classification vectors and obtain a fine-grained classification result through a fully connected layer and a classifier based on the classification vectors.

In an implementation, the first forming module 502 is specifically configured to:

construct an attention perception matrix $P_i$ corresponding to the hybrid high-order attention module, according to the network feature graphs $X_i$ and $Y_i$; merge a spatial perception high-order matrix $(P_i X_i^T)$ obtained according to the attention perception matrix $P_i$ and the network feature graph $X_i$, a gated network $\mathcal{G}$ and the network feature graph $X_i$ to obtain the position relation matrix $E_i$; transpose the position relation matrix $E_i$ and merge the transposed position relation matrix $E_i$ with an encoded network feature graph $Y_i$ to form the high-order feature vector pool.

In an implementation, when the first forming module 502 constructs an attention perception matrix $P_i$ corresponding to the hybrid high-order attention module, according to the network feature graphs $X_i$ and $Y_i$, it is specifically configured to:

encode the network feature graph $Y_i$;
determine the attention perception matrix $P_i$ of each position in the hybrid high-order attention module, according to the transposition of the network feature graph $X_i$ and the encoded network feature graph $Y_i$:

$$P_i = \mathcal{N}\left( \mathcal{M}\left( \frac{1}{C}\sum_{i=1}^{C} X_i^\top \varphi(Y_i) \right) \right) \in \mathbb{R}^{WH \times WH}$$

wherein, the W and H respectively represent the width and height dimensions of the network feature graph, C represents the dimension of the network feature graph, $\mathcal{M}(x)=\text{sign}(x)x^{-1/2}$ represents the matrix normalization method, sign represents the symbol positive and negative characteristics of x, $\mathcal{N}(x)=x/\|x\|_2^2$ represents the L2 normalization, $\mathbb{R}^{WH \times WH}$ represents the size dimension of the generated vector, and T represents the transposition symbol.

In an implementation, when the first forming module 502 merges the spatial perception high-order matrix $(P_i X_i^T)$ obtained according to the attention perception matrix $P_i$ and the network feature graph $X_i$, the gated network $\mathcal{G}$ and the network feature graph $X_i$ to obtain the position relation matrix $E_i$, it is specifically configured to:

performing matrix multiplication on the attention perception matrix $P_i$ and the transposition of the network feature graph $X_i$ to obtain the spatial perception high-order matrix $(P_i X_i^T)$;
constructing the position relation matrix $E_i$, according to the spatial perception high-order matrix:

$$E_i = \mathcal{G}\left( \sum_{c=1}^{C} P_c \right) \cdot (P_i X_i^\top) + X_i$$

wherein, the gated network $\mathcal{G}$ is a fully connected layer neural network of a learnable weight with a dimension of $\mathbb{R}^{WH \times 1}$.

In an implementation, when the first forming module 502 transposes the position relation matrix $E_i$ and merges the transposed position relation matrix $E_i$ with the encoded network feature graph $Y_i$ to form the high-order feature vector pool, it is specifically configured to:

transpose the position relation matrix $E_i$, interact the transposed position relation matrix $E_i$ with the encoded cross-layer matrix $Y_i$, and average it in the WH dimension to obtain the high-order feature vector pool $\mathcal{T}$ with a dimension of $\mathbb{R}^{C_N \times C}$:

$$\mathcal{T} = \mathcal{N}\left(\mathcal{M}\left(\frac{1}{WH}\sum_{i=1}^{WH}\varphi(Y_i)^\top E_i\right)\right) \in \mathbb{R}^{C_N \times C}$$

wherein, $C_N$ represents the number of the elements and C represents the dimension of each vector.

In an implementation, the second forming module 503 is specifically configured to:

use each vector in the high-order feature vector pool as one node to construct a first graph neural network and construct an adjacency matrix according to the semantic similarity to extract a graph embedding feature matrix;

determine a grouping mapping rule from high-dimensional nodes to low-dimensional nodes, according to a second graph neural network;

group nodes according to the grouping mapping rule and the graph embedding feature matrix to obtain the representative vector nodes.

In an implementation, when the second forming module 503 uses each vector in the high-order feature vector pool as one node to construct a first graph neural network and constructs an adjacency matrix according to the semantic similarity to extract a graph embedding feature matrix, it is specifically configured to:

decompose the vectors in the vector pool into $C_N$ vector combinations with the dimension of C, and use each vector with the dimension of C as one feature node to construct a first adjacency matrix $A_{i,j}$ of the first graph neural network:

$$A_{i,j} = \frac{\tau(x_i)^\top \cdot \tau(x_j)}{\|\tau(x_i)\|\|\tau(x_j)\|}$$

wherein, $A_{i,j}$ represents the connection relationship between the i-th node and the j-th node, and $\tau(x_i)$ represents encoding the vector $x_i$ in the vector pool using $\tau$ coding;

add a self-loop operation to the first adjacency matrix $A_{i,j}$ to obtain a second adjacency matrix $\tilde{A}$;

the second adjacency matrix $\tilde{A}$ is:

$$\tilde{A} = A_{i,j} + I$$

wherein, the $I \in \mathbb{R}^{C_N \times C_N}$ is expressed as an identity matrix with a diagonal of 1;

construct a likelihood-constrained graph fusion algorithm according to the second adjacency matrix to obtain a graph embedding feature matrix H:

$$H = \text{ReLU}\left(\tilde{D}^{-\frac{1}{2}}\tilde{A}\tilde{D}^{-\frac{1}{2}}TW^g\right)$$

wherein, $W^g \in \mathbb{R}^{C \times d_h}$ represents a learnable parameter of the first graph neural network, $d_h$ represents the feature dimension after network transformation, T represents the matrix form of the above-mentioned high-order feature vector pool, ReLU represents a rectified linear unit and $$\tilde{D} = \sum_j \tilde{A}_{i,j}$$

represents a diagonal matrix.

In an implementation, when the second forming module 503 determines the grouping mapping rule from high-dimensional nodes to low-dimensional nodes according to the second graph neural network, it is specifically configured to:

according to the second graph neural network, $C_N$ nodes are mapped to be $C_r$ nodes to obtain the mapping relationship $\mathbb{R}^{C_N \times d_h} \to \mathbb{R}^{C_r \times d_h}$;

wherein, the grouping mapping rule matrix G from high-dimensional nodes to low-dimensional nodes is:

$$G = \text{ReLU}\left(\tilde{D}^{-\frac{1}{2}}\tilde{A}\tilde{D}^{-\frac{1}{2}}HW^{emb}\right)$$

wherein, $W^{emb} \in \mathbb{R}^{d_h \times C_r}$ represents a learnable matrix of the second graph neural network.

In an implementation, when the second forming module 503 groups nodes according to the grouping mapping rule and the graph embedding feature matrix to obtain the representative vector nodes, it is specifically configured to:

according to the grouping mapping rule, clusters the convolutional graph embedding feature matrix H into a new graph of $C_r$ nodes to form the representative vector nodes Z:

$$Z = H^\top \frac{e^{G_{i,j}}}{\sum_{j=1}^{C_r} e^{G_{i,j}}} \in \mathbb{R}^{d_h \times C_r}$$

The apparatus provided in this embodiment can execute the technical solutions of the method embodiments shown in FIG. 1 to FIG. 4, their implementation principles and technical effects are similar and will not be repeated here.

Figure 6:
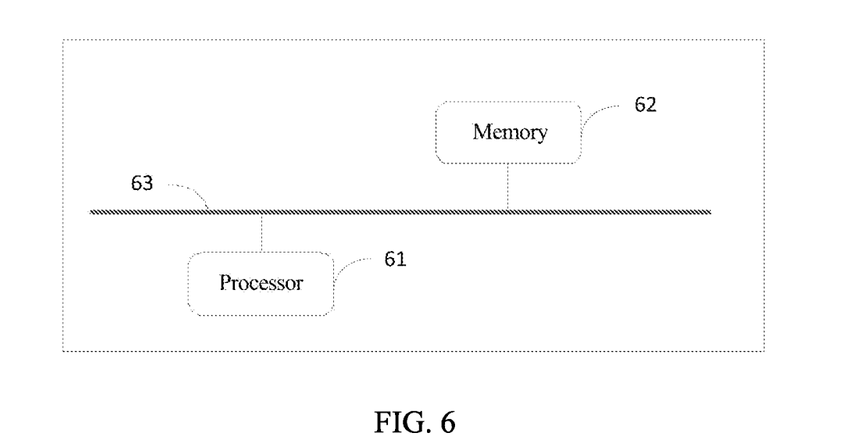
FIG. 6 is a schematic structural diagram of a fine-grained image recognition device using graph structure represented high-order relation discovery provided by an embodiment of the present disclosure.

FIG. 6 is a schematic structural diagram of a fine-grained image recognition device using graph structure represented high-order relation discovery provided by an embodiment of the present disclosure. As shown in FIG. 6, the device provided in this embodiment may include: at least one processor 61 and a memory 62.

The memory 62 stores computer-executable instructions.

At least one processor 61 executes the computer-executable instructions stored in the memory 62, so that the at least one processor 61 executes the method described in any one of the foregoing embodiments.

Wherein, the memory 62 and the processor 61 may be connected through a bus 63.

For the specific implementation principles and effects of the device provided in this embodiment, please refer to the corresponding descriptions and effects of the embodiments shown in FIG. 1 to FIG. 4, which will not be repeated here.

An embodiment of the present disclosure also provides a computer-readable storage medium on which a computer program is stored, and the computer program is executed by a processor to realize the fine-grained image recognition method using graph structure represented high-order relation discovery provided by any embodiment of the present disclosure.

The embodiment of the present disclosure also provides a computer program product, including a computer program which realizes the fine-grained image recognition method using graph structure represented high-order relation discovery according to any embodiment of the present disclosure when executed by a processor.

In the several embodiments provided by the present disclosure, it should be understood that the disclosed apparatus and method can be implemented in other ways. For example, the embodiments of the apparatus described above are only illustrative, for example, the division of modules is only a logical function classification, and there may be other classifications in actual implementation, for example, multiple modules or components can be combined or integrated to another system, or some features can be ignored, or not implemented. In addition, the displayed or discussed mutual coupling or direct coupling or communication connection may be indirect coupling or communication connection through some interfaces, apparatus or modules, and may be in electrical, mechanical or other forms.

The modules described as separate components may or may not be physically separated, and the components displayed as modules may or may not be physical units, that is, they may be located in one place, or they may be distributed on multiple network units. Some or all of the modules can be selected according to actual needs to implement the solution of this embodiment.

In addition, the functional modules in the various embodiments of the present disclosure may be integrated into one processing unit, or each module may exist alone physically, or two or more modules may be integrated into one unit. The units formed by the above modules can be implemented in the form of hardware or hardware plus software functional units.

The above-mentioned integrated modules implemented in the form of software functional modules may be stored in a computer-readable storage medium. The above-mentioned software function module is stored in a storage medium and includes several instructions to make a computer device (which may be a personal computer, a server, or a network device, etc.) or a processor execute part of the steps of the method described in each embodiment of the present disclosure.

It should be understood that the foregoing processor may be a central processing unit (Central Processing Unit, CPU for short), other general-purpose processors, digital signal processors (Digital Signal Processor, DSP for short), and Application Specific Integrated Circuits (Application Specific Integrated Circuit, ASIC for short) and so on. The general-purpose processor may be a microprocessor or the processor may also be any conventional processor or the like. The steps of the method disclosed in combination with the disclosure can be directly embodied as executed by a hardware processor, or executed by a combination of hardware and software modules in the processor.

The memory may include a high-speed RAM memory (Random Access Memory), or may also include a non-volatile memory (NVM), such as at least one disk storage, and may also be a U disk, a mobile hard disk, a read-only memory, a magnetic disk, or an optical disk.

The bus may be an industry standard architecture (ISA) bus, peripheral component interconnect (PCI) bus, or extended industry standard architecture (EISA) bus, etc. The bus can be classified into address bus, data bus, control bus and so on. For ease of representation, the bus in the drawings of the present disclosure is not limited to only one bus or one type of bus.

The above-mentioned storage medium can be realized by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The storage medium can be any available medium that can be accessed by a general-purpose or special-purpose computer.

An exemplary storage medium is coupled to the processor, so that the processor can read information from the storage medium and write information to the storage medium. Of course, the storage medium may also be an integral part of the processor. The processor and the storage medium may be located in application specific integrated circuits (ASIC for short). Of course, the processor and the storage medium can also exist as discrete components in the electronic device or main control device.

Those of ordinary skill in the art can understand that all or part of the steps implementing the foregoing method embodiments can be achieved by a program instructing relevant hardware. The above-mentioned program can be stored in a computer-readable storage medium. When the program is executed, it executes the steps including the foregoing method embodiments; and the foregoing storage medium includes: ROM, RAM, magnetic disk, or optical disk, and other media that can store program codes.

Those skilled in the art will easily think of other embodiments of the present disclosure after considering the specification and practicing the disclosure herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A fine-grained image recognition method using graph structure represented high-order relation discovery, comprising:

inputting an image to be classified into a convolutional neural network feature extractor with multiple stages, and extracting two layers of network feature graphs $X_i$ and $Y_i$ in the last stage;

constructing a hybrid high-order attention module enhanced by a space-gated network according to the network feature graphs $X_i$ and $Y_i$ and forming a high-order feature vector pool according to the hybrid high-order attention module;

using each vector in the high-order feature vector pool as a node to construct a graph neural network, and utilizing semantic similarity among high-order features to form representative vector nodes in groups; and performing global pooling on the representative vector nodes to obtain classification vectors, and obtaining a fine-grained classification result through a fully connected layer and a classifier based on the classification vectors.

2. The method according to claim 1, wherein the constructing a hybrid high-order attention module enhanced by a space-gated network according to the network feature graphs $X_i$ and $Y_i$ and forming a high-order feature vector pool according to the hybrid high-order attention module, comprises:

constructing an attention perception matrix $P_i$ corresponding to the hybrid high-order attention module, according to the network feature graphs $X_i$ and $Y_i$;

merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$; and transposing the position relation matrix $E_i$ and merging the transposed position relation matrix $E_i$ with an encoded network feature graph $Y_i$ to form the high-order feature vector pool.

3. The method according to claim 2, wherein the constructing an attention perception matrix $P_i$ corresponding to the hybrid high-order attention module, according to the network feature graphs $X_i$ and $Y_i$, comprises:

encoding the network feature graph $Y_i$;

determining the attention perception matrix $P_i$ of each position in the hybrid high-order attention module, according to the transposition of the network feature graph $X_i$ and the encoded network feature graph $Y_i$:

$$P_i = \mathcal{N}\left(\mathcal{M}\left(\frac{1}{C}\sum_{i=1}^{C} X_i^T \varphi(Y_i)\right)\right) \in \mathbb{R}^{WH \times WH}$$

wherein, the W and H respectively represent width and height dimensions of the network feature graph, C represents a dimension of the network feature graph, $\mathcal{M}(x) = \text{sign}(x)x^{-1/2}$ represents a matrix normalization method, sign represents symbol positive and negative characteristics of x, $\mathcal{N}(x) = x/\|x\|_2^2$ represents L2 normalization, $\mathbb{R}^{WH \times WH}$ represents a size dimension of the generated vector and T represents a transposition symbol.

4. The method according to claim 2, wherein the merging a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$, comprises:

performing matrix multiplication on the attention perception matrix $P_i$ and the transposition of the network feature graph $X_i$ to obtain the spatial perception high-order matrix $(P_i X_i^T)$;

constructing the position relation matrix $E_i$, according to the spatial perception high-order matrix $(P_i X_i^T)$:

$$E_i = g\left(\sum_{c=1}^{C} P_c\right) \cdot (P_i X_i^T) + X_i$$

wherein, the gated network $\mathcal{G}$ is a fully connected layer neural network of a learnable weight with a dimension of $\mathbb{R}^{WH \times 1}$.

5. The method according to claim 2, wherein the transposing the position relation matrix $E_i$ and merging the transposed position relation matrix $E_i$ with an encoded network feature graph $Y_i$ to form the high-order feature vector pool, comprises:

transposing the position relation matrix $E_i$, interacting the transposed position relation matrix $E_i$ with the encoded cross-layer matrix $Y_i$, and averaging it in the WH dimension to obtain the high-order feature vector pool $\mathcal{T}$ with a dimension of $\mathbb{R}^{C_N \times C}$:

$$\mathcal{T} = \mathcal{N}\left(\mathcal{M}\left(\frac{1}{WH}\sum_{i=1}^{WH}\varphi(Y_i)^T E_i\right)\right) \in \mathbb{R}^{C_N \times C}$$

wherein, $C_N$ represents the number of the elements and C represents the dimension of each vector.

6. The method according to claim 1, wherein the using each vector in the high-order feature vector pool as a node to construct a graph neural network, and utilizing semantic similarity among high-order features to form representative vector nodes in groups, comprises:

using each vector in the high-order feature vector pool as one node to construct a first graph neural network, and constructing an adjacency matrix according to the semantic similarity to extract a graph embedding feature matrix;

determining a grouping mapping rule from high-dimensional nodes to low-dimensional nodes, according to a second graph neural network; and grouping nodes according to the grouping mapping rule and the graph embedding feature matrix to obtain the representative vector nodes.

7. The method according to claim 6, wherein the using each vector in the high-order feature vector pool as one node to construct a first graph neural network, and constructing an adjacency matrix according to the semantic similarity to obtain a graph embedding feature matrix, comprises:

decomposing vectors in the vector pool into $C_N$ vector combinations with a dimension of C, and using each vector with the dimension of C as one feature node to construct a first adjacency matrix $A_{i,j}$ of the first graph neural network:

$$A_{i,j} = \frac{\tau(x_i)^T \cdot \tau(x_j)}{\|\tau(x_i)\| \|\tau(x_j)\|}$$

wherein, $A_{i,j}$ represents a connection relationship between the i-th node and the j-th node, and $\tau(x_i)$ represents encoding a vector $x_i$ in the vector pool using $\tau$ coding;

adding a self-loop operation to the first adjacency matrix $A_{i,j}$ to obtain a second adjacency matrix $\tilde{A}$;

the second adjacency matrix $\tilde{A}$ is:

$$\tilde{A} = A_{i,j} + I$$

wherein, $I \in \mathbb{R}^{C_N \times C_N}$ is expressed as an identity matrix with a diagonal of 1;

constructing a likelihood-constrained graph fusion algorithm according to the second adjacency matrix to obtain a graph embedding feature matrix H:

$$H = ReLU\left(\tilde{D}^{-\frac{1}{2}} \tilde{A} \tilde{D}^{-\frac{1}{2}} T W^g\right)$$

wherein, $W^g \in \mathbb{R}^{C \times d_h}$ represents a learnable parameter of the first graph neural network, $d_h$ represents a feature dimension after network transformation, T represents a matrix form of the above-mentioned high-order feature vector pool, ReLU represents a rectified linear unit and $$\tilde{D} = \sum_j \tilde{A}_{i,j}$$

represents a diagonal matrix.

8. The method according to claim 7, wherein the determining a grouping mapping rule from high-dimensional nodes to low-dimensional nodes according to a second graph neural network, comprises:

according to the second graph neural network, mapping $C_N$ nodes to be $C_r$ nodes to obtain a mapping relationship $\mathbb{R}^{C_N \times d_h} \to \mathbb{R}^{C_r \times d_h}$;

wherein, a grouping mapping rule matrix G from high-dimensional nodes to low-dimensional nodes is:

$$G = ReLU\left(\tilde{D}^{-\frac{1}{2}} \tilde{A} \tilde{D}^{-\frac{1}{2}} H W^{emb}\right)$$

wherein, $W^{emb} \in \mathbb{R}^{d_h \times C_r}$ represents a learnable matrix of the second graph neural network.

9. The method according to claim 6, wherein the grouping nodes according to the grouping mapping rule and the graph embedding feature matrix to obtain the representative vector nodes, comprises:

according to the grouping mapping rule, clustering the convolutional graph embedding feature matrix H into a new graph of $C_r$ nodes to form the representative vector nodes Z:

$$Z = H^T \frac{e^{G_{i,j}}}{\sum_{j=1}^{C_r} e^{G_{i,j}}} \in \mathbb{R}^{d_h \times C_r}.$$

10. A fine-grained image recognition device using graph structure represented high-order relation discovery, comprising:

at least one processor; and a memory storing computer-executable instructions, wherein the computer-executable instructions are executed by the at least one processor, to enable the at least one processor to:

input an image to be classified into a convolutional neural network feature extractor with multiple stages, and extract two layers of network feature graphs $X_i$ and $Y_i$ in the last stage;

construct a hybrid high-order attention module enhanced by a space-gated network according to the two layers of network feature graphs $X_i$ and $Y_i$, and form a high-order feature vector pool according to the hybrid high-order attention module;

use each vector in the high-order feature vector pool as a node to construct a graph neural network, and utilize a semantic similarity among high-order features to form representative vector nodes in groups; and perform global pooling on the representative vector nodes to obtain classification vectors, and obtain a fine-grained classification result through a fully connected layer and a classifier based on the classification vectors.

11. The device according to claim 10, wherein the at least one processor is further enabled to:

construct an attention perception matrix $P_i$ corresponding to the hybrid high-order attention module, according to the network feature graphs $X_i$ and $Y_i$;

merge a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$; and transpose the position relation matrix $E_i$ and merge the transposed position relation matrix $E_i$ with an encoded network feature graph $Y_i$ to form the high-order feature vector pool.

12. The device according to claim 11, wherein the at least one processor is further enabled to:

encode the network feature graph $Y_i$;

determine the attention perception matrix $P_i$ of each position in the hybrid high-order attention module, according to the transposition of the network feature graph $X_i$ and the encoded network feature graph $Y_i$:

$$P_i = \mathcal{N}\left(\mathcal{M}\left(\frac{1}{C}\sum_{i=1}^C X_i^T \varphi(Y_i)\right)\right) \in \mathbb{R}^{WH \times WH}$$

wherein, the W and H respectively represent width and height dimensions of the network feature graph, C represents a dimension of the network feature graph, $\mathcal{M}(x) = \text{sign}(x) x^{-1/2}$ represents a matrix normalization method, sign represents symbol positive and negative characteristics of x, $\mathcal{N}(x) = x/\|x\|_2^2$ represents L2 normalization, $\mathbb{R}^{WH \times WH}$ represents a size dimension of the generated vector and T represents a transposition symbol.

13. The device according to claim 11, wherein the at least one processor is further enabled to:

perform matrix multiplication on the attention perception matrix $P_i$ and the transposition of the network feature graph $X_i$ to obtain the spatial perception high-order matrix $(P_i X_i^T)$;

construct the position relation matrix $E_i$, according to the spatial perception high-order matrix $(P_i X_i^T)$:

$$E_i = g\left(\sum_{c=1}^C P_c\right) \cdot (P_i X_i^T) + X_i$$

wherein, the gated network $\mathcal{G}$ is a fully connected layer neural network of a learnable weight with a dimension of $\mathbb{R}^{WH \times 1}$.

14. The device according to claim 11, wherein the at least one processor is further enabled to:
transpose the position relation matrix $E_i$, interact the transposed position relation matrix $E_i$ with the encoded cross-layer matrix $Y_i$, and average it in the WH dimension to obtain the high-order feature vector pool $\mathcal{T}$ with a dimension of $\mathbb{R}^{C_N \times C}$:

$$\mathcal{T} = \mathcal{N}\left(\mathcal{M}\left(\frac{1}{WH}\sum_{i=1}^{WH}\varphi(Y_i)^T E_i\right)\right) \in \mathbb{R}^{C_N \times C}$$

wherein, $C_N$ represents the number of the elements and C represents the dimension of each vector.

15. The device according to claim 10, wherein the at least one processor is further enabled to:
use each vector in the high-order feature vector pool as one node to construct a first graph neural network, and construct an adjacency matrix according to the semantic similarity to extract a graph embedding feature matrix;
determine a grouping mapping rule from high-dimensional nodes to low-dimensional nodes, according to a second graph neural network; and
group nodes according to the grouping mapping rule and the graph embedding feature matrix to obtain the representative vector nodes.

16. The device according to claim 15, wherein the at least one processor is further enabled to:
decompose vectors in the vector pool into $C_N$ vector combinations with a dimension of C, and use each vector with the dimension of C as one feature node to construct a first adjacency matrix $A_{i,j}$ of the first graph neural network:

$$A_{i,j} = \frac{\tau(x_i)^T \cdot \tau(x_j)}{\|\tau(x_i)\|\|\tau(x_j)\|}$$

wherein, $A_{i,j}$ represents a connection relationship between the i-th node and the j-th node, and $\tau(x_i)$ represents encoding a vector $x_i$ in the vector pool using $\tau$ coding;
add a self-loop operation to the first adjacency matrix $A_{i,j}$ to obtain a second adjacency matrix $\tilde{A}$;
the second adjacency matrix $\tilde{A}$ is:

$$\tilde{A} = A_{i,j} + I$$

wherein, $I \in \mathbb{R}^{C_N \times C_N}$ is expressed as an identity matrix with a diagonal of 1;
construct a likelihood-constrained graph fusion algorithm according to the second adjacency matrix to obtain a graph embedding feature matrix H:

$$H = ReLU\left(\tilde{D}^{-\frac{1}{2}}\tilde{A}\tilde{D}^{-\frac{1}{2}}TW^g\right)$$

wherein, $W^g \in \mathbb{R}^{C \times d_h}$ represents a learnable parameter of the first graph neural network, $d_h$ represents a feature dimension after network transformation, T represents a matrix form of the above-mentioned high-order feature vector pool, ReLU represents a rectified linear unit and $$\tilde{D} = \sum_j \tilde{A}_{i,j}$$

represents a diagonal matrix.

17. The device according to claim 16, wherein the at least one processor is further enabled to:
according to the second graph neural network, map $C_N$ nodes to be $C_r$ nodes to obtain a mapping relationship $\mathbb{R}^{C_N \times d_h} \to \mathbb{R}^{C_r \times d_h}$;
wherein, a grouping mapping rule matrix G from high-dimensional nodes to low-dimensional nodes is:

$$G = ReLU\left(\tilde{D}^{-\frac{1}{2}}\tilde{A}\tilde{D}^{-\frac{1}{2}}HW^{emb}\right)$$

wherein, $W^{emb} \in \mathbb{R}^{d_h \times C_r}$ represents a learnable matrix of the second graph neural network.

18. The device according to claim 15, wherein the at least one processor is further enabled to:
according to the grouping mapping rule, cluster the convolutional graph embedding feature matrix H into a new graph of $C_r$ nodes to form the representative vector nodes Z:

$$Z = H^T \frac{e^{G_{i,j}}}{\sum_{j=1}^{C_r} e^{G_{i,j}}} \in \mathbb{R}^{d_h \times C_r}.$$

19. A non-transitory computer-readable storage medium storing a computer program, wherein the computer program is executed by a computer to:
input an image to be classified into a convolutional neural network feature extractor with multiple stages, and extract two layers of network feature graphs $X_i$ and $Y_i$ in the last stage;
construct a hybrid high-order attention module enhanced by a space-gated network according to the two layers of network feature graphs $X_i$ and $Y_i$, and form a high-order feature vector pool according to the hybrid high-order attention module;
use each vector in the high-order feature vector pool as a node to construct a graph neural network, and utilize a semantic similarity among high-order features to form representative vector nodes in groups; and
perform global pooling on the representative vector nodes to obtain classification vectors, and obtain a fine-grained classification result through a fully connected layer and a classifier based on the classification vectors.

20. The non-transitory computer-readable storage medium according to claim 19, wherein the computer program is further executed by the computer to:
construct an attention perception matrix $P_i$ corresponding to the hybrid high-order attention module, according to the network feature graphs $X_i$ and $Y_i$;
merge a spatial perception high-order matrix $(P_i X_i^T)$ obtained according to the attention perception matrix $P_i$ and the network feature graph $X_i$, a gated network $\mathcal{G}$ and the network feature graph $X_i$ to obtain a position relation matrix $E_i$; and
transpose the position relation matrix $E_i$ and merge the transposed position relation matrix $E_i$ with an encoded network feature graph $Y_i$ to form the high-order feature vector pool.

* * * * *